US012624231B2

(12) United States Patent
Lee et al.

(10) Patent No.: US 12,624,231 B2
(45) Date of Patent: May 12, 2026

(54) ORGANIC SOLVENT COMPOSITION AND PAINT COMPOSITION COMPRISING THE SAME

(71) Applicants: SK Innovation Co., Ltd., Seoul (KR); SK Geo Centric Co., Ltd., Seoul (KR)

(72) Inventors: Joo Pyung Lee, Daejeon (KR); Jun Hee Kim, Daejeon (KR)

(73) Assignees: ANAME OF ASSIGNEE Innovation Co., Ltd., Seoul (KR); SK Geo Centric Co., Ltd., Seoul (KR)

( * ) Notice: Subject to any disclaimer, the term of this patent is extended or adjusted under 35 U.S.C. 154(b) by 965 days.

(21) Appl. No.: 17/729,685

(22) Filed: Apr. 26, 2022

(65) Prior Publication Data

US 2022/0340767 A1 Oct. 27, 2022

(30) Foreign Application Priority Data

Apr. 27, 2021 (KR) ........................ 10-2021-0054140

(51) Int. Cl.
| | |
|---|---|
| *C09D 7/20* | (2018.01) |
| *C09D 133/04* | (2006.01) |
| *C09D 163/00* | (2006.01) |
| *C09D 167/00* | (2006.01) |
| *C09D 175/02* | (2006.01) |
| *C09D 175/04* | (2006.01) |

(52) U.S. Cl.
CPC .............. *C09D 7/20* (2018.01); *C09D 133/04* (2013.01); *C09D 163/00* (2013.01); *C09D 167/00* (2013.01); *C09D 175/02* (2013.01); *C09D 175/04* (2013.01)

(58) Field of Classification Search
CPC ...... C09D 7/20; C09D 133/04; C09D 163/00; C09D 167/00; C09D 175/02; C09D 175/04
See application file for complete search history.

(56) References Cited

U.S. PATENT DOCUMENTS

| | | | |
|---|---|---|---|
| 7,241,930 | B2 | 7/2007 | Schlosberg et al. |
| 2008/0185337 | A1 | 8/2008 | Almadidy et al. |
| 2013/0122420 | A1 | 5/2013 | Kato |
| 2021/0230437 | A1 | 7/2021 | Choi et al. |

FOREIGN PATENT DOCUMENTS

| | | | |
|---|---|---|---|
| AU | 2021102676 | A4 | 7/2021 |
| CN | 107937014 | A | 4/2018 |
| JP | 2004155730 | A | 6/2004 |
| JP | 2006299173 | A | 11/2006 |
| KR | 102050921 | B1 | 12/2019 |
| KR | 20200018869 | A | 2/2020 |
| KR | 20200042630 | A | 4/2020 |
| KR | 20200127870 | A | 11/2020 |
| KR | 102412228 | B1 | 6/2022 |
| WO | 2014047000 | A1 | 3/2014 |

OTHER PUBLICATIONS

Machine translation of JP2006299173.*

* cited by examiner

*Primary Examiner* — Haidung D Nguyen

(74) *Attorney, Agent, or Firm* — The Webb Law Firm

(57) ABSTRACT

The present invention relates to an organic solvent composition and a paint composition including the same, and more particularly, an organic solvent composition including 50 to 75 wt % of C10 aromatic hydrocarbon, 25 to 40 wt % of C9 aromatic hydrocarbon, and less than 150 ppm of naphthalene, in which a weight ratio of trimethylbenzene and tetramethylbenzene is 50:50 to 90:10.

11 Claims, No Drawings

ORGANIC SOLVENT COMPOSITION AND PAINT COMPOSITION COMPRISING THE SAME

CROSS-REFERENCE TO RELATED APPLICATION

The application claims priority to Korean Patent Application No. 10-2021-0054140, filed Apr. 27, 2021, the disclosure of which is hereby incorporated by reference in its entirety.

BACKGROUND OF THE INVENTION

Field of the Invention

The following disclosure relates to an organic solvent composition and a paint composition comprising the same.

Description of Related Art

Heavy aromatic organic solvents including C10 aromatic compound as a main component have excellent working stability due to their excellent solvency and high flash point, and thus, have been used in various industries such as paints, ink adhesives, electronic materials, and solvents for pesticides.

However, the heavy aromatic organic solvents not only lead to equipment problems, such as clogging and corrosion of pipes, by causing a phenomenon of precipitating solids at a low temperature below −10° C., but also reduce solvency of organic solvents by reducing fluidity at a low temperature.

In general, when an organic solvent including an aromatic compound includes a part of an aliphatic compound, a problem of reducing the fluidity of the organic solvent and reducing the solvency by accelerating the precipitation of the aliphatic compound at a low temperature has been reported.

Specifically, a lowest flow temperature at which the organic solvent composition has fluidity is referred to as a pour point. When the temperature of the organic solvent composition drops and approaches the pour point, the organic solvent composition forms precipitates and are gelled, resulting in reducing the fluidity of the composition. This reduces the solvency of the organic solvent and makes transport of the composition through lines or pumps difficult.

The heavy aromatic organic solvent compositions have an excellent advantage as an organic solvent because of having a lower pour point than that of the organic solvent composition including the aliphatic compound, but have a problem in that the availability of the heavy aromatic organic solvents is limited by the formation of precipitates and the formation of gelation when stored or transported in an extreme environment below −30° C.

RELATED ART DOCUMENT

Patent Document

U.S. Pat. No. 7,241,930 B2

SUMMARY OF THE INVENTION

Technical Problem

An embodiment of the present invention is directed to providing a heavy aromatic organic solvent without the formation of precipitates and the formation of gelation even at an extremely low temperature.

Technical Solution

In one general aspect, an organic solvent composition includes: 50 to 75 wt % of C10 aromatic hydrocarbon, 25 to 40 wt % of C9 aromatic hydrocarbon, and less than 150 ppm of naphthalene, wherein a weight ratio of trimethylbenzene and tetramethylbenzene is 50:50 to 90:10.

The weight ratio of dimethylethylbenzene and tetramethylbenzene in the organic solvent composition may be 50:50 to 90:10.

The organic solvent composition may not substantially include methylnaphthalene.

The organic solvent composition may have a pour point of −90° C. to −30° C.

The organic solvent composition may have a specific gravity of 0.880 to 0.895.

The organic solvent composition may have an IBP of 170° C. to 185° C.

The organic solvent composition may have an FBP of 190° C. to 210° C.

The organic solvent composition may have a dry point of 180□ to 200□.

The organic solvent composition may have a mixed aniline point of 10° C. to 25° C.

In another aspect, there is provided a paint composition comprising the organic solvent composition and any one or mixed resins of two or more selected from ester-based, urethane-based, urea-based, epoxy-based and acrylic-based resins.

The paint composition may include 20 to 40 wt % of the organic solvent composition based on a total weight.

Advantageous Effects

According to the organic solvent composition according to an exemplary embodiment, it is possible to effectively suppress a solid precipitation phenomenon at a low temperature of −30° C. or less, which was a problem of the existing heavy aromatic solvent composition. Accordingly, it is possible to suppress the occurrence of precipitates during long-term storage in a storage container for storing the organic solvent composition, and effectively suppress the clogging and corrosion of a pipe during low-temperature flow. In addition, it is possible to provide an organic solvent with low toxicity because the content of naphthalene, which is classified as a specific water hazardous substance and a 2B class carcinogen, is remarkably reduced.

In addition, according to an embodiment, it is possible to provide an aromatic organic solvent composition with remarkably improved solvency for a resin because of having a mixed aniline point (e.g., 15° C. or lower) of a certain level or less, and to provide an aromatic organic solvent composition satisfying all a dry point (e.g., 180° C. to 200° C.) in a certain range for an appropriate drying rate, a flash point (e.g., 55° C. or higher) above a certain level to ensure stability in a manufacturing process, and a pour point (e.g., −50° C. or lower) below a certain level for effective prevention of a decrease in fluidity deterioration at a low temperature.

Accordingly, an aromatic organic solvent composition according to an exemplary embodiment has excellent compatibility, and when it is prepared with a paint, a detergent, an electronic material composition, etc., including the same, the compatibility may be further improved.

DESCRIPTION OF THE INVENTION

Hereinafter, the present invention will be described in more detail. In this case, technical terms and scientific terms used in the present specification have the general meaning understood by those skilled in the art to which the present invention pertains unless otherwise defined, and a description for the known function and configuration unnecessarily obscuring the gist of the present invention will be omitted in the following description.

The term used herein, "includes" is an open description that has an equivalent meaning to expressions such as "comprises," "contains," "has" or "characterizes," and does not exclude elements, materials, or processes not listed further.

An embodiment relates to an aromatic organic solvent composition having a reduced naphthalene content. The existing aromatic organic solvent composition has excellent compatibility with resins, but has difficulties in clogging or corroding pipes of process equipment due to a solid precipitation phenomenon at a low temperature. Accordingly, an organic solvent composition includes: 50 to 75 wt % of C10 aromatic hydrocarbon, 25 to 40 wt % of C9 aromatic hydrocarbon, and less than 150 ppm of naphthalene, in which a weight ratio of trimethylbenzene and tetramethylbenzene is 50:50 to 90:10. As the aromatic organic solvent composition according to an embodiment satisfies all of the above composition combinations, the aromatic organic solvent composition not only effectively improves the solid precipitation phenomenon at an extremely low temperature, but also has low toxicity and a safe flash point, and has excellent compatibility and solvency with resins More specifically, the aromatic organic solvent composition according to an embodiment may include 60 to 75 wt % of C10 aromatic hydrocarbon and 25 to 35 wt % of C9 aromatic hydrocarbon.

The C9 aromatic hydrocarbon is not particularly limited as long as it is an aromatic hydrocarbon material composed of 9 carbons, but specific examples of the C9 aromatic hydrocarbon may include any one or a mixture of two or more selected from isopropylbenzene, n-propylbenzene, 1-methyl-4-ethylbenzene, 1-methyl-3-ethylbenzene, 1,3,5-trimethylbenzene, 1-methyl-2-ethylbenzene, 1,2,4-trimethylbenzene, 1,2,3-trimethylbenzene, indane, p-ethyltoluene, o-ethyltoluene, m-ethyltoluene, and the like.

The C10 aromatic hydrocarbon is not particularly limited as long as it is an aromatic hydrocarbon material composed of 10 carbons, but specific examples of C10 aromatic hydrocarbon may include any one or a mixture of two or more selected from t-butylbenzene, isobutylbenzene, sec-butylbenzene, 1-methyl-3-isopropylbenzene, 1-methyl-4-isopropylbenzene, 1,3-diethylbenzene, 1-methyl-2-isopropylbenzene, 1-methyl-3-n-propylbenzene, 1-methyl-4-n-propylbenzene, 1,4-diethylbenzene, n-butylbenzene, 1,3-dimethyl-5-ethylbenzene, 1,2-diethylbenzene, 1-methyl-2-n-propylbenzene, 1,4-dimethyl-2-ethylbenzene, 1,3-dimethyl-4-ethylbenzene, 1,2-dimethyl-4-ethylbenzene, 1,3-dimethyl-2-ethylbenzene, 2-methylindane, 1-methylindane, 1,2-dimethyl-3-ethylbenzene, 1,2,4,5-tetramethylbenzene, 1,2,3,5-tetramethylbenzene, 5-methylindane, 1,2,3,4-tetramethylbenzene, 4-methylindane, tetralin, naphthalene, and the like.

Specifically, 1,2,3-trimethylbenzene and 1,2-dimethyl-4-ethylbenzene may each independently be included in an amount of 5 wt % to 30 wt %, and more specifically, in an amount of 10 wt % to 25 wt %. In addition, 1,2,4-trimethylbenzene, 1,3-dimethyl-5-ethylbenzene, 1,4-dimethyl-2-ethylbenzene, 1,3-dimethyl-4-ethylbenzene, 1,2,4,5-tetramethylbenzene, and 1,2,3,5-tetramethylbenzene may each independently be included in an amount of 1 wt % to 10 wt %, and more specifically, in an amount of 5 wt % to 10 wt %.

A weight ratio of trimethylbenzene and tetramethylbenzene in the organic solvent composition may be 50:50 to 90:10, and preferably 60:40 to 80:20. In the case where the weight ratio satisfies the above numerical range, when combined with other components, the aromatic organic solvent composition according to an embodiment may have a better evaporation rate compared to the existing C10 aromatic organic solvent. In an organic solvent for paint, a drying rate greatly affects the main characteristics of coating film formation, such as workability and smoothness, so maintaining an appropriate drying rate is an essential element for maintaining excellent coating film properties. Furthermore, the organic solvent may have a better pour point compared to the existing C10 aromatic organic solvent, so the solid precipitation phenomenon at an extremely low temperature may be more effectively suppressed. The trimethylbenzene may refer to a mixture of trimethylbenzene isomers, and specifically, may include 1,3,5-trimethylbenzene, 1,2,3-trimethylbenzene, and 1,2,4-trimethylbenzene. Specifically, the trimethylbenzene satisfies the above-described weight ratio, but may be included in an amount of 10 to 40 wt % based on the total weight of the organic solvent composition, and more specifically, may be included in an amount of 15 to 35 wt %.

The tetramethylbenzene may refer to a mixture of tetramethylbenzene isomers, and specifically, may include 1,2,4,5-tetramethylbenzene, 1,2,3,5-tetramethylbenzene and 1,2,3,4-tetramethylbenzene. Specifically, the tetramethylbenzene satisfies the above-described weight ratio, but may be included in an amount of 5 to 30 wt % based on the total weight of the organic solvent composition, and more specifically, in an amount of 10 to 25 wt %, even more specifically in an amount of 10 to 20 wt % % content, and even still more specifically, in an amount of 10 to 15 wt %.

The weight ratio of dimethylethylbenzene and tetramethylbenzene in the organic solvent composition may be 50:50 to 90:10, and specifically, the weight ratio of dimethylethylbenzene to tetramethylbenzene may be 60:40 to 80:20.

The dimethylethylbenzene may refer to a mixture of dimethylethylbenzene isomers, and specifically, may include 1,3-dimethyl-5-ethylbenzene, 1,4-dimethyl-2-ethylbenzene, 1,3-dimethyl-4-ethylbenzene, 1,2-dimethyl-4-ethylbenzene, 1,3-dimethyl-2-ethylbenzene, and 1,2-dimethyl-3-ethylbenzene. Specifically, the dimethylethylbenzene may be included in an amount of 20 to 60 wt % based on the total weight of the organic solvent composition, and more specifically, may be included in an amount of 30 to 50 wt %. In the case where the above numerical range is satisfied, when combined with other components, the aromatic organic solvent composition according to an embodiment may have better solvency and compatibility with resins compared to the existing C10 aromatic organic solvent, and in particular, may have very good solvency for various engineering resins.

In addition, the organic solvent composition according to an embodiment includes less than 150 ppm of naphthalene. In general, when the aromatic solvent composition including 50 wt % or more of C10 aromatic hydrocarbon includes naphthalene, the solid precipitation phenomenon of the aromatic compound including naphthalene may be accelerated by the interaction between the C10 aromatic hydrocarbon and the naphthalene.

However, as the organic solvent composition includes less than 150 ppm of naphthalene and satisfies the weight ratio of trimethylbenzene and tetramethylbenzene as described above, although the organic solvent composition includes 50 wt % or more of C10 aromatic hydrocarbon, and at the same time, includes the C9 aromatic hydrocarbon, it is possible to effectively suppress the solid precipitation phenomenon of the aromatic compound including naphthalene at a low temperature of −30° C. or less. Accordingly, it is possible to suppress the occurrence of precipitates during long-term storage in a storage container for storing the organic solvent composition, and effectively suppress the clogging and corrosion of a pipe during low-temperature flow. In addition, it is possible to provide an organic solvent with low toxicity because the content of naphthalene, which is classified as a specific water hazardous substance and a 2B class carcinogen, is remarkably reduced.

The organic solvent composition may not substantially include methylnaphthalene. The meaning of substantially not including in the present specification is not interpreted as meaning excluding up to the content included as impurities. Substantially not including means that the methylnaphthalene of the total weight of the composition includes specifically 100 ppm or less, and even more specifically 0 to 10 ppm.

Since the organic solvent composition according to the exemplary embodiment does not substantially include methylnaphthalene, the pour point of the organic solvent composition may be more remarkably improved. In addition, the solid precipitation phenomenon of the aromatic compound may be more effectively suppressed at a low temperature, the generation of precipitates may be suppressed during long-term storage in the storage container for storing the organic solvent composition, and the clogging phenomenon of the pipe during low temperature flow may be effectively suppressed.

The organic solvent composition may have a pour point of −90° C. to −30° C., and more preferably −90° C. to −50° C.

The organic solvent composition may have a specific gravity of 0.880 to 0.894, and more preferably 0.880 to 0.890.

The organic solvent composition may have an IBP of 170° C. to 185° C., and more preferably 170° C. to 180° C.

The organic solvent composition may have an FBP of 190° C. to 210° C., and more preferably 195° C. to 205° C. By having the IBP and FBP as described above, the organic solvent composition of the present invention may have an appropriate flash point.

The organic solvent composition may have a dry point of 180° C. to 200° C., and more preferably 185° C. to 195° C., and may have an excellent evaporation rate compared to the existing C10 aromatic organic solvent.

The organic solvent composition may have a mixed aniline point of 10° C. to 25° C., preferably 10° C. to 20° C., and more preferably 10° C. to 15° C. The organic solvent composition of the present invention may have excellent solvency and compatibility with resins due to the mixed aniline point as described above.

The organic solvent composition may have a flash point of 50° C. to 70° C. By having the flash point as described above, the organic solvent composition is classified as second petroleum and may be applied to various industries. Petroleum organic solvents are classified as first petroleum, which are easily ignited by being sensitive to small impacts, slight moisture, fire, and the like when the flash point is less than 21☐, and have restrictions on manufacturing, transportation, transportation, storage, and specified quantity, and are highly likely to cause stability problems such as fire will occur during use. However, when the petroleum organic solvents have a flash point of 21° C. or higher as described above, and specifically 21° C. to 70° C., the petroleum organic solvents are classified as the second petroleum and may secure stability, and have few restrictions on manufacturing, transportation, transportation, storage, and the like, and thus, may be provided a solvent in various fields.

In addition, an exemplary embodiment provides a paint composition comprising the organic solvent composition and any one or mixed resins of two or more selected from ester-based, urethane-based, urea-based, epoxy-based and acrylic-based resins.

The organic solvent composition may be provided as a paint composition by directly mixing with the resin, or may be provided as a paint composition by evaporating a portion of a hydrocarbon-based mixture in the organic solvent composition and then mixing the evaporated hydrocarbon-based mixture with a resin, but is not limited thereto.

The resin may be any one or a mixed resin of two or more selected from a polyester resin, a polyurethane resin, a polyurea resin, an epoxy resin, an acrylic resin, and the like, and is not particularly limited as long as it is modified resins of these resins, and are resins including a specific repeating unit of the above-described resins, such as a polyurethane-urea resin, epoxy-modified urethane resin, and an epoxy-modified acrylic resin.

The paint composition may be one including 20 to 40 wt % of the organic solvent composition based on the total weight. Preferably, the paint composition may be one including 20 to 35 wt % of organic solvent composition, but is not limited thereto.

The aromatic organic solvent composition with reduced naphthalene content according to an exemplary embodiment may be applied to various industries such as paints, inks, detergents, adhesives, electronic materials, and pesticide solvents.

As described above, the embodiments of the present invention have been described in detail, but those of ordinary skill in the art to which the present invention pertains may practice the present invention with various modifications without departing from the spirit and scope of the present invention as defined in the appended claims. Accordingly, modifications of future embodiments of the present invention will not depart from the teachings of the present invention.

[Method of Measuring Physical Properties]

1. Saybolt color
The saybolt color was measured based on ASTMD1209.
2. Specific Gravity (15.56/15.56☐)
The specific gravity was measured based on ASTM D4052.
3. Pour point
The pour point was measured based on ASTM D97.
4. Mixed Aniline point
The mixed aniline point was measured based on ASTM D611.
5. Flash point
The flash point was measured based on ASTMD56.
6. Distillation range (IBP~FBP)
The range from an initial boiling point (IBP) to a final boiling point (FBP) was measured based on ASTMD86.
7. Dry point
The dry point was measured based on ASTM D850.

Examples 1 to 5

An organic solvent composition was prepared by mixing C9-C10 aromatic hydrocarbon compounds in an amount corresponding to Examples 1 to 5 of Table 1 below. The organic solvent compositions of Examples 1 to 5 were measured according to the method of measuring physical properties, and are shown in Table 4 below.

Comparative Examples 1 to 7

An organic solvent composition was prepared by mixing C9-C10 aromatic hydrocarbon compounds in an amount corresponding to Comparative Examples 1 to 7 in Table 2 below. The organic solvent compositions of Comparative Examples 1 to 7 were measured according to the method for measuring physical properties, and are shown in Table 4 below.

TABLE 1

| | | Example 1 | Example 2 | Example 3 | Example 4 | Example 5 |
|---|---|---|---|---|---|---|
| C9 (wt %) | 1,2,4-Trimethylbenzene | 8.1 | 8.7 | 8.5 | 9.4 | 9.8 |
| | 1,2,3-Trimethylbenzene | 16.9 | 19.4 | 17.8 | 21.2 | 24.5 |
| | Others | 1.5 | 3.4 | 4.5 | 3.3 | 2.9 |
| | Total | 26.5 | 31.5 | 30.8 | 33.9 | 37.2 |
| C10 (wt %) | 1,4-Dimethyl-2-ethylbenzene | 5.6 | 5.2 | 8.4 | 6.9 | 6.2 |
| | 1,3-Dimethyl-4-ethylbenzene | 5.7 | 5.3 | 8.7 | 6.8 | 6.5 |
| | 1,3-Dimethyl-5-ethylbenzene | 5.8 | 5.2 | 8.7 | 6.8 | 6.5 |
| | 1,2-Dimethyl-4-ethylbenzene | 24.8 | 23.7 | 17 | 15.1 | 13.8 |
| | 1,2,4,5-Tetramethylbenzene | 6.4 | 6.3 | 6.5 | 6.2 | 5.8 |
| | 1,2,3,5-Tetramethylbenzene | 5.9 | 5.1 | 7.3 | 6.2 | 5.8 |
| | 1-Methyl-3-n-propylbenzene | 4.5 | 3.4 | 2.8 | 3.9 | 3.2 |
| | 1,2-Dimethyl-3-ethylbenzene | 2.8 | 2.5 | 2.3 | 2.1 | 2.1 |
| | Naphthalene | 0.012 | 0.0082 | 0.0038 | 0.0019 | 0.0053 |
| | Others | 12.0 | 11.8 | 7.5 | 12.1 | 12.9 |
| | Total | 73.5 | 68.5 | 69.2 | 66.1 | 62.8 |
| | Total (wt %) | 100 | 100 | 100 | 100 | 100 |

TABLE 2

| | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| C9 (wt %) | 1,2,4-Trimethylbenzene | 9.4 | 9.3 | 9.3 | 4.3 | 17.9 | 4.7 | 18.3 |
| | 1,2,3-Trimethylbenzene | 21.2 | 21.7 | 21.6 | 14.8 | 27.4 | 16.1 | 25.9 |
| | Others | 3.2 | 3.2 | 3.2 | 1.3 | 3.5 | 5.8 | 2.3 |
| | Total | 33.8 | 34.2 | 34.1 | 20.4 | 48.8 | 26.6 | 46.5 |
| C10 (wt %) | 1,4-Dimethyl-2-ethylbenzene | 6.8 | 6.2 | 5.9 | 9.2 | 4.1 | 8.7 | 4.3 |
| | 1,3-Dimethyl-4-ethylbenzene | 6.9 | 6.3 | 5.8 | 9.1 | 4.2 | 8.8 | 4.3 |
| | 1,3-Dimethyl-5-ethylbenzene | 6.8 | 6.6 | 5.8 | 9.1 | 8.2 | 8.8 | 7.9 |

TABLE 2-continued

| | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| 1,2-Dimethyl-4-ethylbenzene | 10.0 | 11.3 | 12.8 | 14.7 | 10.8 | 13.5 | 11.3 |
| 1,2,4,5-Tetramethylbenzene | 11.0 | 11.1 | 12.2 | 12.5 | 13.2 | 15.2 | 11.5 |
| 1,2,3,5-Tetramethylbenzene | 6.3 | 6.1 | 6.2 | 8.5 | 4.2 | 8.3 | 7.1 |
| 1-Methyl-3-n-propylbenzene | 3.8 | 4.3 | 4.8 | 4.7 | 3.2 | 4.3 | 2.9 |
| 1,2-Dimethyl-3-ethylbenzene | 2.7 | 2.5 | 2.3 | 3.8 | 1.3 | 2.5 | 1.1 |
| Naphthalene | 0.016 | 0.020 | 0.025 | 0.010 | 0.025 | 0.010 | 0.010 |
| Others | 11.9 | 11.4 | 10.1 | 8.0 | 2.0 | 3.3 | 3.1 |
| Total | 66.2 | 65.8 | 65.9 | 79.6 | 51.2 | 73.4 | 53.5 |
| Total (wt %) | 100 | 100 | 100 | 100 | 100 | 100 | 100 |

TABLE 3

| | Example 1 | Example 2 | Example 3 | Example 4 | Example 5 |
|---|---|---|---|---|---|
| C9 (wt %) | 26.5 | 31.5 | 30.8 | 33.9 | 37.2 |
| C10(wt %) | 73.5 | 68.5 | 69.2 | 66.1 | 62.8 |
| Trimethyl-benzene:Tetra-methyl benzene (Weight ratio) | 1:0.5 | 1:0.4 | 1:0.5 | 1:0.4 | 1:0.3 |
| Naphthalene (wt %) | 0.012 | 0.0082 | 0.0038 | 0.0019 | 0.0053 |

| | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| C9 (wt %) | 33.8 | 34.2 | 34.1 | 20.4 | 48.8 | 26.6 | 46.5 |
| C10(wt %) | 66.2 | 65.8 | 65.9 | 79.6 | 51.2 | 73.4 | 53.5 |
| Trimethyl-benzene:Tetra-methyl benzene (Weight ratio) | 1:0.6 | 1:0.6 | 1:0.6 | 1:1.1 | 1:0.4 | 1:1.1 | 1:0.4 |
| Naphthalene (wt %) | 0.016 | 0.020 | 0.025 | 0.010 | 0.025 | 0.010 | 0.010 |

TABLE 4

| | Pour point (□) | Color (Say bolt) | Specific gravity | Mixed aniline point (□) | Distillation range (□) | Flash point (□) |
|---|---|---|---|---|---|---|
| Example 1 | −75 | 30 | 0.889 | 15.0 | 179.2-205.1 | 61 |
| Example 2 | −72 | 30 | 0.887 | 14.8 | 177.2-199.2 | 63 |
| Example 3 | −81 | 30 | 0.885 | 14.3 | 177.5-199.5 | 59 |
| Example 4 | −83 | 30 | 0.884 | 14.4 | 177.2-199.1 | 62 |
| Example 5 | −80 | 30 | 0.879 | 14.1 | 176.8-198.7 | 58 |
| Comparative Example 1 | −28 | 30 | 0.887 | 14.5 | 176.8-199.3 | 63 |
| Comparative Example 2 | −26 | 30 | 0.890 | 14.8 | 176.8-198.9 | 59 |
| Comparative Example 3 | −20 | 30 | 0.890 | 15.0 | 178.3-200.3 | 62 |
| Comparative Example 4 | −19 | 30 | 0.897 | 15.5 | 189.2-217.8 | 63 |
| Comparative Example 5 | −18 | 30 | 0.874 | 13.9 | 161.2-182.9 | 60 |
| Comparative Example 6 | −22 | 30 | 0.892 | 15.2 | 185.1-212.5 | 62 |
| Comparative Example 7 | −10 | 30 | 0.871 | 13.8 | 161.5-182.4 | 60 |

[Experimental Example 1] Evaluation on Whether Precipitates Occur

The compositions of Examples 1 to 5 and Comparative Examples 1 to 7 were put in a polyethylene bottle and stored at −35° C. to observe whether or not precipitates occur, and the results were described in Table 5 below (1A: Occurrence of precipitates after 1 week of storage, 2A: Occurrence of precipitates after 2 weeks of storage, 3A: Occurrence of precipitates after 3 weeks of storage, and 4A: Occurrence of precipitates after 4 weeks of storage, -: No precipitates).

TABLE 5

| | Example | | | | | Comparative Example | | | | | | |
|---|---|---|---|---|---|---|---|---|---|---|---|---|
| | 1 | 2 | 3 | 4 | 5 | 1 | 2 | 3 | 4 | 5 | 6 | 7 |
| Whether precipitates occur | — | — | — | — | — | 4A | 4A | 2A | 2A | 1A | 2A | 3A |

As shown in Table 4, it could be seen that the organic solvent composition according to the present invention had a remarkably excellent pour point, and in addition, it could be seen that the solid precipitation phenomenon of the aromatic compound at a low temperature may be effectively suppressed through Experimental Example 1. Specifically, in the case of the compositions of Examples 1 to 5, the precipitation phenomenon did not occur even after observation for 8 weeks, whereas the compositions of Comparative Examples 1 to 7 had low stability, and showed that the precipitation phenomenon occurs. This suggests that the organic solvent composition according to the present invention may suppress the occurrence of precipitates during long-term low-temperature storage in a storage container, and may effectively suppress the phenomenon of clogging the pipe when flowing in the pipe.

Hereinabove, although the present invention has been described by way of specific details and limited examples, these are only provided to help a more general understanding of the present invention. Therefore, the present invention is not limited to the exemplary embodiments. Various modifications and changes may be made by those skilled in the art to which the present invention pertains from this description.

Therefore, the spirit of the present invention should not be limited to these exemplary embodiments, but the claims and all of modifications equal or equivalent to the claims are intended to fall within the scope and spirit of the present invention.

The invention claimed is:

1. An organic solvent composition, comprising: 50 to 75 wt % of C10 aromatic hydrocarbon comprising tetramethylbenzene, 25 to 40 wt % of C9 aromatic hydrocarbon comprising trimethylbenzene, and less than 150 ppm of naphthalene based on a total weight of the organic solvent composition, wherein a weight ratio of trimethylbenzene to tetramethylbenzene is 50:50 to 90:10, and the organic solvent composition has a pour point of −90° C. to −30° C.

2. The organic solvent composition of claim 1, wherein the C10 aromatic hydrocarbon of the organic solvent composition further comprises dimethylethylbenzene, and a weight ratio of dimethylethylbenzene to tetramethylbenzene in the organic solvent composition is 50:50 to 90:10.

3. The organic solvent composition of claim 1, wherein the organic solvent composition does not substantially include methylnaphthalene.

4. The organic solvent composition of claim 1, wherein the organic solvent composition has a specific gravity of 0.880 to 0.895.

5. The organic solvent composition of claim 1, wherein the organic solvent composition has an IBP of 170° C. to 185° C.

6. The organic solvent composition of claim 1, wherein the organic solvent composition has an FBP of 190° C. to 210° C.

7. The organic solvent composition of claim 1, wherein the organic solvent composition has a dry point of 180° C. to 200° C.

8. The organic solvent composition of claim 1, wherein the organic solvent composition has a mixed aniline point of 10° C. to 25° C.

9. The organic solvent composition of claim 1, wherein the amount of C9 hydrocarbon is 30 to 40 wt % based on a total weight of the organic solvent composition.

10. A paint composition comprising the organic solvent composition of claim 1 and any one or mixed resins of two or more selected from ester-based, urethane-based, urea-based, epoxy-based and acrylic-based resins.

11. The paint composition of claim 10, wherein the paint composition includes 20 to 40 wt % of the organic solvent composition based on a total weight.

* * * * *